United States Patent
Feng et al.

(10) Patent No.: US 11,752,520 B2
(45) Date of Patent: Sep. 12, 2023

(54) METHODS FOR PRODUCING NANOTEXTURED SURFACES

(71) Applicant: Corning Incorporated, Corning, NY (US)

(72) Inventors: Jiangwei Feng, Painted Post, NY (US); Guisong Lu, Shanghai (CN); Dale Robert Powers, Painted Post, NY (US); He Wang, Shanghai (CN); Huiqing Wu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 101 days.

(21) Appl. No.: 17/106,849

(22) Filed: Nov. 30, 2020

(65) Prior Publication Data

US 2021/0162455 A1  Jun. 3, 2021

(30) Foreign Application Priority Data

Nov. 28, 2019  (CN) .......................... 201911191029.1

(51) Int. Cl.
| | | |
|---|---|---|
| *B05D 3/02* | (2006.01) | |
| *B05D 5/00* | (2006.01) | |
| *C01B 33/14* | (2006.01) | |
| *C09D 1/00* | (2006.01) | |
| *B82Y 30/00* | (2011.01) | |
| *B82Y 40/00* | (2011.01) | |

(52) U.S. Cl.
CPC ............. *B05D 3/0218* (2013.01); *B05D 5/00* (2013.01); *C01B 33/14* (2013.01); *C09D 1/00* (2013.01); *B05D 2350/60* (2013.01); *B82Y 30/00* (2013.01); *B82Y 40/00* (2013.01)

(58) Field of Classification Search
CPC ... B05D 1/08; B05D 1/10; B05D 1/60; B05D 1/62; B05D 3/044; B05D 7/52; B05D 2506/10; B05D 2420/02; B05D 2425/01
USPC .................................. 427/190, 427, 446, 453
See application file for complete search history.

(56) References Cited

U.S. PATENT DOCUMENTS

| | | | | |
|---|---|---|---|---|
| 2,904,449 | A  * | 9/1959 | Bradstreet | ................. C23C 4/11 |
| | | | | 191/1 A |
| 8,795,773 | B2 * | 8/2014 | Remington, Jr. | ...... C23C 16/453 |
| | | | | 427/255.19 |
| 8,834,964 | B2 * | 9/2014 | Kitada | .................... B32B 33/00 |
| | | | | 427/427 |
| 10,155,361 | B2 * | 12/2018 | Bookbinder | ............. B05D 1/18 |
| 2009/0104369 | A1 * | 4/2009 | Rajala | ................... C04B 41/009 |
| | | | | 427/475 |
| 2010/0203287 | A1 * | 8/2010 | Jiang | ................... B05C 11/1005 |
| | | | | 428/141 |
| 2012/0225297 | A1 * | 9/2012 | Birka | ...................... B05D 1/10 |
| | | | | 427/446 |

FOREIGN PATENT DOCUMENTS

KR     20060112546 A   *  11/2006

OTHER PUBLICATIONS

Tikkanen et al. Characteristics of the liquid flame spray process. Surface and Coatings Technology 90 (1997) 210-216. (Year: 1997).*
Jiang et al. High Performance Nanostructured Coatings and Nanopowders by NanoSpray(SM) Combustion Processing. MRS Online Proceedings Library 1353, 204 (2011). (Year: 2011).*
Average Roughness Basics. Webpage [online]. Michigan Metrology, LLC, 2022 [retrieved on Aug. 31, 2022]. Retrieved from Internet: <https://michmet.com/average-roughness-basics/>. (Year: 2022).*
Mazumder et al., "Superomniphobic, Transparent, and Antireflection Surfaces Based on Hierarchical Nanostructures", Nano Lett., vol. 14, 2014, pp. 4677-4681.

* cited by examiner

*Primary Examiner* — William P Fletcher, III
(74) *Attorney, Agent, or Firm* — Travis B. Gasa

(57) ABSTRACT

Methods for producing a nanotextured surface on a substrate include forming nanoparticles from a precursor within a stream of a carrier gas. Methods include heating a surface of a substrate facing the carrier gas. Methods comprise delivering the nanoparticles to the surface of the substrate facing the carrier gas to produce the nanotextured surface.

15 Claims, 15 Drawing Sheets

METHODS FOR PRODUCING NANOTEXTURED SURFACES

BACKGROUND

This application claims the benefit of priority under 35 U.S.C. § 119 of Chinese Patent Application Serial No. 201911191029.1, filed on Nov. 28, 2019, the content of which is relied upon and incorporated herein by reference in its entirety.

Optical surfaces that can repel water and/or oil are of great interest for use in a diverse array of applications, including anti-icing or anti-fogging glass (e.g., windows for automotive or aerospace applications), low drag surfaces, self-cleaning solar panels, and anti-smudge ("easy-to-clean") touch screens for electronics.

Although flat substrates bearing hydrophobic coatings can achieve water contact angles of about 120°, structural and material limitations prevent these materials from exhibiting higher contact angles, which are necessary to realize superhydrophobic or self-cleaning properties required for the aforementioned applications. Although textured surfaces may be engineered to achieve even higher contact angles through etching or coating processes, these methods are constrained by maximum feature sizes, which should not exceed 100-200 nm to remain invisible to the human eye and preserve substrate transparency (e.g., for touchscreens). Consequently, these processes require complex processing to create nanoscale textures (e.g., etching) or require post-deposition thermal treatment (e.g., sol-gel coating), making them more costly and less attractive for large-scale implementation. Additionally, nanotextured coatings obtained by these conventional methods possess insufficient mechanical stability and adhesion strength to withstand long-term use, and instead lose their hydrophobic or anti-smudge properties over time due to erosion or removal of their nanoscale texture.

Accordingly, simple, low-cost, versatile methods are needed for producing durable nanotextured surfaces for easy-to-clean products that can maintain their hydrophobic or anti-smudge characteristics over long-term use.

SUMMARY

In some embodiments, a method for producing a nanotextured surface on a substrate comprises (a) introducing a precursor into a stream of a carrier gas; (b) forming nanoparticles from the precursor within the stream of the carrier gas; (c) disposing a substrate in the stream of the carrier gas such that a surface of the substrate faces the carrier gas; (d) heating the surface of the substrate facing the carrier gas; and (e) delivering the nanoparticles to the surface of the substrate facing the carrier gas to produce a nanotextured surface.

In one aspect, which is combinable with any of the other aspects or embodiments, the method for producing a nanotextured surface further comprises (f) coating the nanotextured surface with a coating material after (e).

In another aspect, which is combinable with any of the other aspects or embodiments, the precursor is vaporized before being introduced into the stream of the carrier gas.

In another aspect, which is combinable with any of the other aspects or embodiments, the nanotextured surface comprises nanoparticles that are sintered to the substrate.

In another aspect, which is combinable with any of the other aspects or embodiments, the nanoparticles comprise silica ($SiO_2$), titania ($TiO_2$), zirconia ($ZrO_2$), alumina ($Al_2O_3$), calcium oxide (CaO), magnesium oxide (MgO), diboron trioxide ($B_2O_3$), zinc oxide (ZnO), or a combination thereof. In yet another aspect, which is combinable with any of the other aspects or embodiments, the nanoparticles comprise silica ($SiO_2$).

In another aspect, which is combinable with any of the other aspects or embodiments, the coating material comprises a fluorinated silane.

In another aspect, which is combinable with any of the other aspects or embodiments, the coating (f) comprises: immersion coating from solution, dip coating, manually applying the coating material to the substrate surface, spray coating, physical vapor deposition, chemical vapor deposition, or spin coating.

In another aspect, which is combinable with any of the other aspects or embodiments, the nanoparticles have an average diameter between about 50 nm and 250 nm.

In another aspect, which is combinable with any of the other aspects or embodiments, the nanotextured surface has a water contact angle of at least about 120° after (f) coating the nanotextured surface with a coating material. In still another aspect, which is combinable with any of the other aspects or embodiments, the nanotextured surface has a water contact angle of greater than 120° after abrasion testing using a cloth wipe resistance test applying a load of 7.5 $N/cm^2$ for at least 100,000 cycles.

In another aspect, which is combinable with any of the other aspects or embodiments, the forming (b) comprises combustion or hydrolysis of the precursor. In yet another aspect, which is combinable with any of the other aspects or embodiments, the forming (b) and heating (d) are performed using a flame.

In another aspect, which is combinable with any of the other aspects or embodiments, the nanotextured surface has an average surface roughness of 30 nm to 500 nm. In another aspect, which is combinable with any of the other aspects or embodiments, the nanotextured surface has an average thickness of 30 nm to 1000 nm.

In another aspect, which is combinable with any of the other aspects or embodiments, the heating (d) comprises adjusting the temperature of the surface of the substrate facing the carrier gas to between 500° C. and 2000° C. In still another aspect, which is combinable with any of the other aspects or embodiments, the heating (d) comprises reducing the viscosity of the surface of the substrate facing the carrier gas to between $10^7$ Pa·s and $10^{10}$ Pa·s.

DETAILED DESCRIPTION

Figure 1:
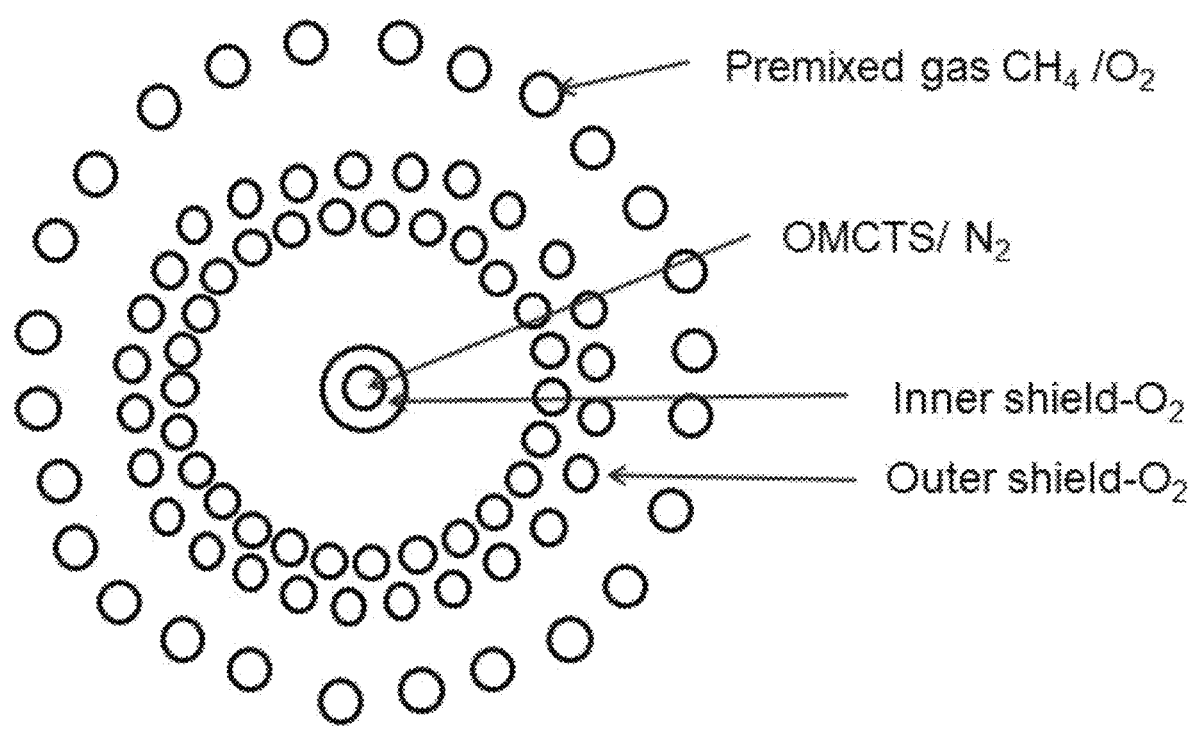
FIG. 1 is a schematic illustration of one embodiment of a nozzle structure for a flame deposition apparatus.

The present disclosure relates to an improved flame deposition method for forming high-contact-angle, easy-to-clean nanotextured surfaces by fusing or sintering nanoparticles to a substrate. Nanotextured surfaces prepared according to the present disclosure achieve high water contact angles)(>140°. The nanotextured surfaces can maintain high contact angles)(>130° and remain adhered to the substrate throughout prolonged abrasive testing. Therefore, nanotextured surfaces thus prepared maintain their hydrophobic properties over long-term use despite repeated abrasive contact, making them attractive for use in a wide range of applications.

The present disclosure relates to a method for producing a nanotextured surface on a substrate. In some embodiments, the method according to the present disclosure comprises (a) introducing a precursor into a stream of a carrier gas; (b) forming nanoparticles from the precursor within the stream of carrier gas; (c) disposing a substrate in the stream of the carrier gas such that a surface of the substrate faces the carrier gas; (d) heating the surface of the substrate facing the carrier gas; and (e) delivering the nanoparticles to the surface of the substrate facing the carrier gas to produce a nanotextured surface.

Substrate

The substrate material may comprise any glass, ceramic, glass-ceramic, polymer, metal, or composite material, or combinations thereof. In embodiments, the substrate material is a glass. Non-limiting examples of glasses suitable for use as substrates include, but are not limited to, borosilicate glasses, soda lime glasses, soda aluminosilicate glasses, lithium borosilicate glasses, other ion-exchangeable glasses, or fused silica glasses. In an embodiment, the substrate material comprises $SiO_2$. The geometry of the substrate is not particularly limited. In embodiments, the substrate may be any two-dimensional or three-dimensional structure (e.g., a tube, a membrane, etc.). In some embodiments, the substrate is a planar substrate (e.g., a glass sheet or glass pane).

Precursor

The method according to the present disclosure comprises introducing a precursor into a stream of a carrier gas. The precursor may be any chemical compound that reacts with surrounding gases, water, or other precursor molecules (e.g., by combustion, hydrolysis, or other oxidative processes) to form nanoparticles. In some embodiments, the precursor may be any metal oxide, ceramic, or metal precursor used in chemical vapor deposition or physical vapor deposition, including metal halides, metal oxides, metal alkoxides, or mixtures thereof. Examples of such precursors include, but are not limited to, $SiCl_4$, $TiCl_4$, $AlCl_3$, $ZrCl_4$, $BCl_3$, titanium isopropoxide, aluminum isopropoxide, Mg(1,1,1,5,5,5-hexafluoro-2,4-pentanedioneate)$_2$(diamine), Ca(perfluorobutoxide)$_2$(diglyme)$_2$, diethylzinc, zirconium t-butoxide, or trimethyl borate.

In some embodiments, the precursor is a precursor for forming silica ($SiO_2$), such as a silane, siloxane, or any other type of compound with four chemical substituents on a silicon atom. In some embodiments, the precursor is an organosilicon compound. Examples of such precursors include, but are not limited to, octamethylcyclotetrasiloxane ("OMCTS"), tetraethylorthosilicate ("TEOS"), hexamethyldisiloxane, methyltrimethoxysilane, octamethyltrisiloxane, and decamethylcyclopentasiloxane.

The precursor may be introduced into a carrier gas stream as a liquid or as a vapor. For example, in some embodiments, the precursor may be vaporized (e.g., by heating) before being introduced into a carrier gas stream. In other embodiments, a precursor may first be dissolved in a solvent (e.g., ethanol, methanol, isopropanol, or any other suitable solvent) before being introduced into the carrier gas stream, either as a liquid or as a vapor. In other embodiments, the precursor may be introduced directly into the carrier gas stream (e.g., by a syringe pump) as a liquid without first being vaporized or dissolved in a solvent.

Carrier Gas

In some embodiments of the method according the present disclosure, the precursor may be introduced into a carrier gas stream before reacting with surrounding gases, water, or other precursors (e.g., by combustion, hydrolysis, or other oxidative processes) to form nanoparticles. In some embodiments, the carrier gas is any gas suitable for delivering the precursor to a reactor or flame where the precursor reacts with surrounding gases, water, or other precursors (e.g., by oxidation, hydrolysis, combustion, etc.) to form nanoparticles. The composition of the carrier gas is not particularly limited. In some embodiments, the carrier gas is an inert gas (e.g., nitrogen or argon). In an embodiment, the carrier gas is nitrogen. In other embodiments, the carrier gas may be a reactive gas, such as oxygen, hydrogen, or mixtures thereof. In still other embodiments, the carrier gas may be a mixture of one or more reactive gases (e.g., oxygen or hydrogen) with one or more inert gases (e.g., nitrogen or argon). In other embodiments, the carrier gas may be air.

Nanoparticles

The method according to the present disclosure comprises forming nanoparticles from the precursor within the stream of the carrier gas. The composition of the nanoparticles is not particularly limited and may include metals, alloys, metal oxides, ceramics, glasses, or combinations thereof. Exemplary nanoparticle compositions that may be formed according to the present disclosure include, but are not limited to, titania ($TiO_2$), silica ($SiO_2$), alumina ($Al_2O_3$), magnesium oxide (MgO), calcium oxide (CaO), zinc oxide (ZnO), zirconia ($ZrO_2$), diboron trioxide ($B_2O_3$), or combinations thereof. In some embodiments, the nanoparticles comprise silica ($SiO_2$).

In some embodiments, the nanoparticles are of a suitable size to produce a nanotextured surface that exhibits a high water contact angle (>120°) while maintaining the transparency of the substrate. In some embodiments, the nanoparticles are substantially spherical with a diameter of between about 10 nm and 1000 nm, between about 20 nm and 500 nm, between about 30 nm and 400 nm, between about 40 nm and 300 nm, between about 50 nm and 250 nm, between about 50 nm and 200 nm, between about 50 nm and 150 nm, between about 50 nm and 100 nm, between about 100 nm and 250 nm, between about 100 nm and 200 nm, or between about 100 and 150 nm. In embodiments, the nanoparticles have a diameter of about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1000 nm, or any value thereinbetween.

The shape of the nanoparticles formed according to the present disclosure is not particularly limited. The nanoparticles may comprise spheres, rods, prisms, stars, tubes, or combinations thereof. In some embodiments, the nanoparticles comprise spheres.

Nanotextured Surfaces

The method according to the present disclosure comprises delivering the nanoparticles to the surface of the substrate facing the carrier gas to produce a nanotextured surface. The nanotextured surface may comprise one or multiple layers of nanoparticles. In some embodiments, the nanotextured surface has an average thickness (measured from the top of the substrate, or measured as the average peak-to-valley height of the nanotextured surface), of between 10 and 1500 nm, between 20 and 1200 nm, between 30 and 1000 nm, between 50 and 700 nm, between 70 and 500 nm, or between 90 and 300 nm, or any range or value therein. In some embodiments, the nanotextured surface has a thickness of about 10 nm, about 20 nm, about 30 nm, about 40 nm, about 50 nm, about 60 nm, about 70 nm, about 80 nm, about 90 nm, about 100 nm, about 120 nm, about 140 nm, about 160 nm, about 180 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900, about 950 nm, about 1000 nm, about 1100 nm, about 1200 nm, about 1300 nm, about 1400 nm, or about 1500 nm or greater, or any value thereinbetween.

In some embodiments, the nanotextured surface produced according to the present disclosure may comprise one or multiple layers of nanoparticles, having a surface roughness (e.g., as measured by atomic force microscopy, stylus profilometry, laser reflectivity, BET analysis, optical interferometry, or any other method known in the art) of 30 to 500 nm, 40 to 400 nm, 50 to 300 nm, or any range or value therein. In some embodiments, the surface roughness is about 30 nm, about 40 nm, about 50 nm, about 60 nm, about 70 nm, about 80 nm, about 90 nm, about 100 nm, about 120 nm, about 140 nm, about 160 nm, about 180 nm, about 200 nm, about 250 nm, about 300 nm, about 350 nm, about 400 nm, about 450 nm, about 500 nm, or any value thereinbetween.

A nanotextured surface produced according to the present disclosure may be continuous or discontinuous. In some embodiments, the nanotextured surface covers at least about 20%, at least about 25%, at least about 30%, at least about 40%, at least about 50%, at least about 60%, at least about 70%, at least about 80%, at least about 90%, at least about 95%, or about 100% of the substrate surface, or any range or value therein. In some embodiments, the nanotextured surface covers about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% of the substrate surface, or any value thereinbetween.

Flame Deposition for Producing Nanotextured Surfaces

The method according to the present disclosure may comprise any technique suitable for forming nanoparticles from one or more precursors and the depositing nanoparticles onto a substrate to produce a nanotextured surface. In some embodiments, the method according to the present disclosure may comprise physical vapor deposition, chemical vapor deposition, outside vapor deposition, or flame deposition, or any other suitable deposition method. In some embodiments, the method according to the present disclosure comprises a flame deposition method.

Flame Deposition. Flame deposition is a flexible and scalable process for synthesis and deposition of nanotextured surfaces over large surface areas requiring very short times (seconds to minutes). By this method, a flame (or flame zone) is generated by ignition of a gas mixture (e.g., $CH_4/O_2$ or $H_2/O_2$), which is introduced into a burner using one or more streams of a gas mixture, typically through a nozzle. A precursor is introduced into the flame zone by delivery through a tube and/or nozzle (either by vapor transport or injection), typically in the presence of a carrier gas. Once the precursor is introduced into the flame zone, the heat generated by the surrounding flame drives reaction of the precursor (e.g., by combustion, hydrolysis, or other oxidative processes) with the surrounding gases, water, or other precursor molecules. The surrounding gases may comprise one or more reactive gas streams (e.g., $O_2$, air, $N_2/O_2$, $H_2/O_2$, $O_2/H_2O$, etc.), which are supplied to the burner through one or more nozzles, to form nanoparticles in-situ (i.e., within the flame and within the stream of carrier gas). Nanoparticles are formed by reaction of precursors with surrounding gases, water, or other precursor molecules (e.g., by combustion, hydrolysis, or other oxidative processes) within the flame zone.

Without being bound to any particular theory, it is believed that reaction (e.g., combustion, hydrolysis, or other oxidative processes) of precursors (e.g., organosilicon precursors) generates vaporized metal oxide moieties (e.g., silicon oxide moieties), which nucleate to form nanoparticles within the gas stream. Further condensation of vaporized metal oxide moieties onto the nanoparticle surfaces within the gas stream causes nanoparticle growth. The solid nanoparticles formed from the precursor(s) within the carrier gas stream are accelerated by the carrier gas stream, through the flame zone and onto a substrate surface facing the carrier gas stream. The substrate may be positioned or moved such that it lies within the carrier gas stream (containing nanoparticles), either within outside the flame zone, and such that the surface of the substrate facing the carrier gas is heated.

Meanwhile, a substrate holder disposes a substrate within the carrier gas stream and within the flame zone (e.g., by carrying the substrate through the flame or through the carrier gas stream near the flame). The heat produced by the flame raises the temperature of the surface of the substrate facing the carrier gas stream to reduce its viscosity, while carrier gas delivers the in-situ formed nanoparticles to the substrate surface. Thus, the surface of the substrate facing the flame is "softened" in the heat as it travels through or near the flame, and the impinging nanoparticles (which are also heated by the flame) sinter to the substrate surface or become embedded into the softened substrate material, creating one or multiple layers of nanoparticles that are strongly adhered (i.e., "fused") to the substrate to produce a nanotextured surface. Simultaneously, impinging nanoparticles, which are also heated by the flame, may sinter to the substrate surface, to adjacent particles on the substrate surface, or to both, further enhancing the roughness and mechanical stability of the nanotextured surface thus obtained.

The method according to the present disclosure comprises heating the surface of the substrate facing the carrier gas. Without being bound to any particular theory, it is believed that the heating reduces the viscosity of the substrate surface facing the carrier gas and softens the substrate surface to promote sintering of nanoparticles to the substrate surface, such that the nanoparticles become embedded into or fused to the substrate. In some embodiments, heating the surface of the substrate facing the carrier gas comprises heating the surface of the substrate until its viscosity reaches a range of between $10^7$ and $10^{10}$ Pa·s, between $5 \times 10^7$ and $10^{10}$ Pa·s, between $10^8$ and $10^{10}$ Pa·s, between between $5 \times 10^8$ and $10^{10}$ Pa·s, between $10^9$ and $10^{10}$ Pa·s, between $5 \times 10^9$ and $10^{10}$ Pa·s, between $10^7$ and $5 \times 10^9$ Pa·s, between $10^7$ and $10^9$ Pa·s, between $10^7$ and $5 \times 10^8$ Pa·s, between $10^7$ and $10^8$ Pa·s, between $10^7$ and $5 \times 10^7$ Pa·s, or any range or value therein.

In some embodiments, heating the surface of the substrate facing the carrier gas comprises heating the surface of the substrate until its viscosity reaches a value of about $10^7$ Pa·s, about $2 \times 10^7$ Pa·s, about $3 \times 10^7$ Pa·s, about $4 \times 10^7$ Pa·s, about $5 \times 10^7$ Pa·s, about $6 \times 10^7$ Pa·s, about $7 \times 10^7$ Pa·s, about $8 \times 10^7$ Pa·s, about $9 \times 10^7$ Pa·s, about $10^8$ Pa·s, about $2 \times 10^8$ Pa·s, about $3 \times 10^8$ Pa·s, about $4 \times 10^8$ Pa·s, about $5 \times 10^8$ Pa·s, about $6 \times 10^8$ Pa·s, about $7 \times 10^8$ Pa·s, about $8 \times 10^8$ Pa·s, about $9 \times 10^8$ Pa·s, about $10^9$ Pa·s, about $2 \times 10^9$ Pa·s, about $3 \times 10^9$ Pa·s, about $4 \times 10^9$ Pa·s, about $5 \times 10^9$ Pa·s, about $6 \times 10^9$ Pa·s, about $7 \times 10^9$ Pa·s, about $8 \times 10^9$ Pa·s, about $9 \times 10^9$ Pa·s, or about $10^{10}$ Pa·s, or any value thereinbetween.

In some embodiments, heating the surface of the substrate facing the carrier gas comprises heating the surface of the substrate to a temperature between 500° C. and 2000° C., between 500° C. and 1900° C., between 500° C. and 1800° C., between 500° C. and 1700° C., between 500° C. and 1600° C., between 500° C. and 1500° C., between 500° C. and 1400° C., between 500° C. and 1300° C., between 500° C. and 1200° C., between 500° C. and 1100° C., between 500° C. and 1000° C., between 500° C. and 900° C., between 500° C. and 800° C., between 500° C. and 700° C., between 500° C. and 600° C., between 600° C. and ° C. and 2000° C., between 700° C. and 2000° C., between 800° C. and 2000° C., between 900° C. and 2000° C., between 1000° C. and 2000° C., between 1100° C. and 2000° C., between 1200° C. and 2000° C., between 1300° C. and 2000° C., between, 1400° C. and 2000° C., between 1500° C. and 2000° C., between 1600° C. and 2000° C., between 1700° C. and 2000° C., between 1800° C. and 2000° C., between 1900° C. and 2000° C., between 600° C. and 1900° C., between 700° C. and 1800° C., between 800° C. and 1700° C., between 900° C. and 1600° C., or between 1000° C. and 1500° C., or any range or value therein.

In some embodiments, heating the surface of the substrate facing the carrier gas comprises heating the surface of the substrate to a temperature of about 500° C., about 550° C., about 600° C., about 650° C., about 700° C., about 750° C., about 800° C., about 850° C., about 900° C., about 950° C., about 1000° C., about 1050° C., about 1100° C., about 1150° C., about 1200° C., about 1250° C., about 1300° C., about 1350° C., about 1400° C., about 1450° C., about 1500° C., about 1550° C., about 1600° C., about 1650° C., about 1700° C., about 1750° C., about 1800° C., about 1850° C., about 1900° C., about 1950° C., or about 2000° C., or any value thereinbetween.

In some embodiments, heating the surface of the substrate facing the carrier gas is performed using a flame (e.g., the flame of a flame deposition process or apparatus). In some embodiments, the temperature of the surface of the substrate facing the carrier gas may be measured by any suitable method known in the art (e.g., using a pyrometer).

Flame deposition is a versatile process that permits preparation of high-purity materials. Various glasses and ceramics, for example, can be synthesized, depending on the choice of precursor material. Examples of materials that have been successfully prepared using flame deposition are $TiO_2$, $SiO_2$, $Al_2O_3$, $MgO$, $CaO$, $ZnO$, $ZrO_2$, $B_2O_3$, and others. Because the flame deposition process mixes precursor elements at the atomic or molecular level within the flame zone, various doped and mixed oxides may be prepared.

In one embodiment of a flame deposition method, vaporized precursor is delivered through a nozzle to the flame zone. Referring to FIG. 1, one embodiment of a nozzle for a flame deposition process comprises a central tube surrounded by annular rings of apertures permitting flow of various gases or gas mixtures. The central tube is fluidly connected to a vaporizer, which receives liquid precursor (in pure form or in solution) from a syringe pump, then generates precursor vapor by heating. The vaporizer is also fluidly connected to a carrier gas stream, which transports vaporized precursor into the burner through a nozzle, where the surrounding flame drives reaction of the vaporized precursor with the surrounding gases (e.g., by combustion, hydrolysis, or other oxidative processes) to form nanoparticles in the carrier gas stream. The carrier gas also delivers the nanoparticles formed within the carrier gas stream toward the surface of the substrate facing the carrier gas stream.

The central tube is surrounded by inner and outer gas rings, which may be adjusted to control the flame temperature and shape, stabilize gas flow, and supply excess oxygen to support reaction (e.g., combustion) of the precursor. In this embodiment, the inner shield and outer shield permit $O_2$ gas flow for oxidizing the precursor. The outer ring permits flow of $CH_4/O_2$ gas mixture to produce a flame for driving reaction of the precursor with the surrounding gases (e.g., by combustion) and for heating the substrate surface as it travels through or over the flame.

Figure 2:
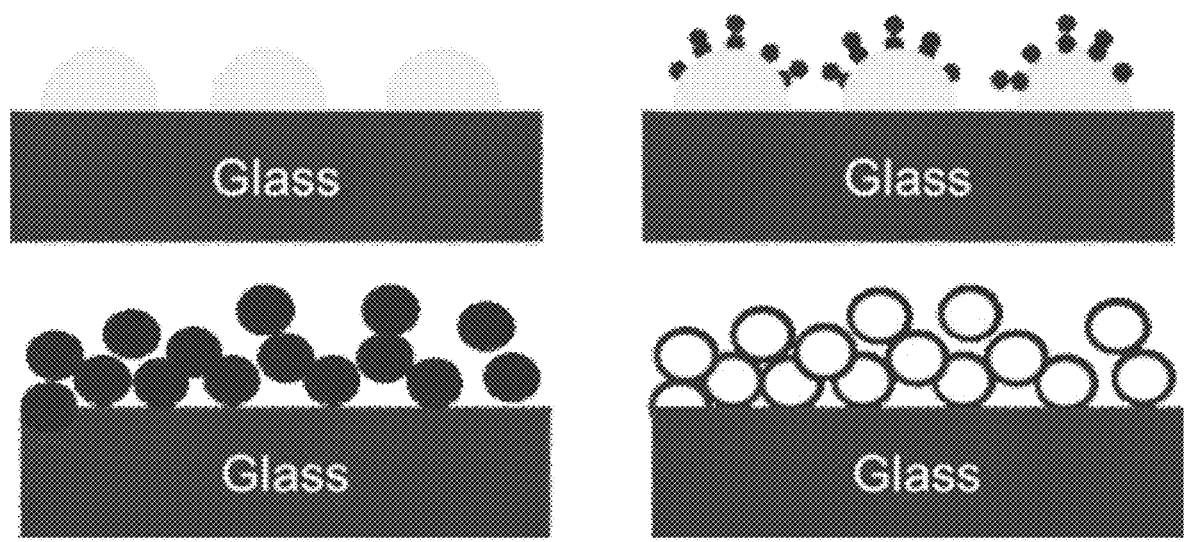
FIG. 2 shows a schematic illustration of different coating morphologies obtainable by methods according to the present disclosure.

Several flame deposition process parameters may be varied to produce a wide variety of nanotextured surfaces. For example, gas flow rates, gas selection, gas mixture ratios, precursor selection, precursor injection rate, substrate movement speed, and other process parameters may be varied to alter the size, shape, distribution, and concentration of nanoparticles produced and delivered to the substrate surface. Thus, flame deposition may be used to produce a variety of nanotextured surfaces, including nanoparticles, microspheres, two-dimensional coatings, or three-dimensional membranes. Referring to FIG. 2, exemplary coating morphologies accessible by flame deposition include, but are not limited to, discrete particles (top left), hierarchical structures (top right), porous membranes comprising particles (bottom left), or porous membranes comprising hollow spheres (bottom right).

Process parameters that may be varied to produce nanotextured coatings of different morphologies. By way of non-limiting example, in some embodiments, the $CH_4/O_2$ ratio may be varied by using different flow rates. For example, a $CH_4$ flow rate in a $CH_4/O_2$ gas mixture may be between 1 and 100 SLPM, between 2 and 90 SLPM, between 3 and 80 SLPM, between 4 and 70 SLPM, between 5 and 60 SLPM, between 10 and 55 SLPM, between 15 and 50 SLPM, between 20 and 45 SLPM, or between 25 and 40 SLPM, or any range or value therein. In some embodiments, a $CH_4$ flow rate in a $CH_4/O_2$ gas mixture may be about 1 SLPM, about 2 SLPM, about 3 SLPM, about 4 SLPM, about 5 SLPM, about 6 SLPM, about 7 SLPM, about 8 SLPM, about 9 SLPM, about 10 SLPM, about 15 SLPM, about 20 SLPM, about 25 SLPM, about 30 SLPM, about 35 SLPM, about 40 SLPM, about 45 SLPM, about 50 SLPM, about 60 SLPM, about 70 SLPM, about 80 SLPM, about 90 SLPM, or about 100 SLPM, or any value thereinbetween.

Similarly, in some embodiments, an $O_2$ flow rate in a $CH_4/O_2$ gas mixture may be between 1 and 70 SLPM, between 2 and 60 SLPM, between 3 and 50 SLPM, between 4 and 40 SLPM, between 5 and 30 SLPM, between 10 and 25 SLPM, or between 15 and 20 SLPM, or any range or value therein. In some embodiments, an $O_2$ flow rate in a $CH_4/O_2$ gas mixture may be about 1 SLPM, about 2 SLPM, about 3 SLPM, about 4 SLPM, about 5 SLPM, about 6 SLPM, about 7 SLPM, about 8 SLPM, about 9 SLPM, about 10 SLPM, about 15 SLPM, about 20 SLPM, about 25 SLPM, about 30 SLPM, about 35 SLPM, about 40 SLPM, about 45 SLPM, about 50 SLPM, about 60 SLPM, or about 70 SLPM, or any value thereinbetween.

In some embodiments, according to the present disclosure, an inner shield $O_2$ flow rate is between about 0 and 20 SLPM, between about 0 and 15 SLPM, between about 0 and 10 SLPM, or between about 0 and 5 SLPM, or any range or value therein. In some embodiments, an inner shield $O_2$ flow rate is about 0 SLPM, about 1 SLPM, about 1.5 SLPM, about 2 SLPM, about 2.5 SLPM, about 3 SLPM, about 3.5 SLPM, about 4 SLPM, about 4.5 SLPM, about 5 SLPM, about 5.5 SLPM, about 6 SLPM, about 6.5 SLPM, about 7 SLPM, about 7.5 SLPM, about 8 SLPM, about 8.5 SLPM, about 9 SLPM, about 9.5 SLPM, about 10 SLPM, about 11 SLPM, about 12 SLPM, about 13 SLPM, about 14 SLPM, about 15 SLPM, about 16 SLPM, about 17 SLPM, about 18 SLPM, about 19 SLPM, or about 20 SLPM, or any value thereinbetween.

In some embodiments, according to the present disclosure, an outer shield $O_2$ flow rate is between about 0 and 20 SLPM, between about 0 and 15 SLPM, between about 0 and 10 SLPM, or between about 0 and 5 SLPM, or any range or value therein. In some embodiments, an outer shield $O_2$ flow rate may be about 0 SLPM, about 1 SLPM, about 1.5 SLPM, about 2 SLPM, about 2.5 SLPM, about 3 SLPM, about 3.5 SLPM, about 4 SLPM, about 4.5 SLPM, about 5 SLPM, about 5.5 SLPM, about 6 SLPM, about 6.5 SLPM, about 7 SLPM, about 7.5 SLPM, about 8 SLPM, about 8.5 SLPM, about 9 SLPM, about 9.5 SLPM, about 10 SLPM, about 11 SLPM, about 12 SLPM, about 13 SLPM, about 14 SLPM, about 15 SLPM, about 16 SLPM, about 17 SLPM, about 18 SLPM, about 19 SLPM, or about 20 SLPM, or any value thereinbetween.

In some embodiments, a carrier gas flow rate may be between 1 and 70 SLPM, between 2 and 60 SLPM, between 3 and 50 SLPM, between 4 and 40 SLPM, between 5 and 30 SLPM, between 10 and 25 SLPM, or between 15 and 20 SLPM, or any range or value therein. In some embodiments, a carrier gas flow rate may be about 1 SLPM, about 2 SLPM, about 3 SLPM, about 4 SLPM, about 5 SLPM, about 6 SLPM, about 7 SLPM, about 8 SLPM, about 9 SLPM, about 10 SLPM, about 15 SLPM, about 20 SLPM, about 25 SLPM, about 30 SLPM, about 35 SLPM, about 40 SLPM, about 45 SLPM, about 50 SLPM, about 60 SLPM, or about 70 SLPM, or any value thereinbetween.

The gas flow rates may be adjusted to increase or decrease the flame temperature. In some embodiments, the flame temperature is between 1500° C. and 3500° C., between 1700° C. and 3300° C., between 2000° C. and 3000° C., between 2200° C. and 2800° C., or any range or value therein. In some embodiments, the flame temperature is about 1500° C., about 1600° C., about 1700° C., about 1800° C., about 1900° C., about 2000° C., about 2100° C., about 2200° C., about 2300° C., about 2400° C., about 2500° C., about 2600° C., about 2700° C., about 2800° C., about 2900° C., about 3000° C., about 3100° C., about 3200° C., about 3300° C., about 3400° C., or about 3500° C., or any value thereinbetween. In embodiments, the flame temperature may be estimated by methods known in the art (e.g., by adiabatic flame temperature calculation).

By adjusting the amount of time the substrate surface is exposed to the flame (or heat generated by the flame), the substrate surface temperature (and thereby the viscosity of the substrate surface) may be adjusted to control the degree of sintering of nanoparticles to the substrate surface. In some embodiments, the substrate is moved across the carrier gas stream and/or the flame at a speed suitable for reducing the viscosity of the surface of the substrate facing the carrier gas stream without damaging the bulk substrate material or affecting the substrate structure (e.g., flatness). In some embodiments, the substrate movement speed may be between 1 and 100 mm/s, between 5 and 90 mm/s, between 10 and 80 mm/s, between 20 and 70 mm/s, or between 30 and 60 mm/s, or any range or value therein. In some embodiments, the substrate movement speed may be about 1 mm/s, about 2 mm/s, about 3 mm/s, about 4 mm/s, about 5 mm/s, about 10 mm/s, about 15 mm/s, about 20 mm/s, about 25 mm/s, about 30 mm/s, about 35 mm/s, about 40 mm/s, about 45 mm/s, about 50 mm/s, about 55 mm/s, about 60 mm/s, about 65 mm/s, about 70 mm/s, about 75 mm/s, about 80 mm/s, about 85 mm/s, about 90 mm/s, about 95 mm/s, or about 100 mm/s, or greater, or any value thereinbetween.

In some embodiments, the substrate may be moved translationally across the carrier gas stream and/or the flame without rotation, such that a surface of the substrate facing the carrier gas is heated and coated with nanoparticles. In other embodiments, the substrate may be rotated over the flame and/or carrier gas, such that the entire outer surface of the substrate is heated and coated with nanoparticles.

Coating Materials

In some embodiments, the method of producing a nanotextured surface according the present disclosure further comprises coating the nanotextured surface with a coating material after delivering the nanoparticles to a surface of the substrate facing the carrier gas. The coating material may be any material suitable for lowering the surface energy of the nanotextured surface and increasing its hydrophobic character. The coating material is not particularly limited and may comprise one or more polymers, metals, ceramics, glass-ceramics, or glasses, or any combination thereof, which may be physisorbed, chemisorbed, or both physisorbed and chemisorbed to the nanotextured surface.

In some embodiments, the coating material may comprise an organic self-assembled monolayer with a head group that adsorbs or bonds to the nanotextured surface. As non-limiting examples, an organothiol monolayer may be formed onto metal nanotextured surfaces, an organic phosphonic acid monolayer onto metal oxide nanotextured surfaces, or an organosilane monolayer onto a glass (e.g., silica) surface. In some embodiments, the coating material may comprise one or more hydroxylated parrafins, alkylphenols, fatty acids, aliphatic amides, fatty alcohols, fatty amines, alkyl or acyl maleates, alkyl or aryl ketones, or polyoxyacrylic derivatives.

In some embodiments, the coating material may comprise a halogenated material, such as a fluorinated material, which may be a fluorinated monolayer, fluoropolymer, fluorinated copolymer, or other material. In some embodiments, the coating material is a fluorinated silane (e.g., UD509 (Daikin Chemicals)).

In some embodiments, coating the nanotextured surface with a coating material after delivering the nanoparticles to a surface of the substrate facing the carrier gas produces a layer of coating material having a thickness of between 10 and 100 nm, between 10 nm and 90 nm, between 10 nm and 80 nm, between 10 nm and 70 nm, between 10 nm and 60 nm, between 10 nm and 50 nm, between 10 nm and 40 nm, between 10 nm and 30 nm, or between 10 nm and 20 nm, or any range or value therein. In some embodiments, the layer of the coating material has a thickness of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm, or any value thereinbetween.

In some embodiments, coating the nanotextured surface with a coating material after delivering the nanoparticles to a surface of the substrate facing the carrier gas may comprise any method known in the art suitable for forming a coating onto a surface. Examples include, but are not limited to, immersion coating from solution, dip coating, manually applying the coating material to the substrate surface, spray coating, physical vapor deposition, chemical vapor deposition, or spin coating.

Water Contact Angles

In some embodiments, the method according to the present disclosure may produce a hydrophobic nanotextured surface that exhibits a high water contact angle. In some embodiments, the water contact angle of the nanotextured surface may be at least 90°, at least 95°, at least 100°, at least 105°, at least 110°, at least 115°, at least 120°, at least 125°, at least 130°, at least 135°, at least 140°, at least 145°, at least 150°, at least 155°, at least 160°, at least 165°, or at least 170°, or any range or value therein. In some embodiments, the contact angle of the nanotextured surface may be about 90°, about 95°, about 100°, about 105°, about 110°, about 115°, about 120°, about 125°, about 130°, about 135°, about 140°, about 145°, about 150°, about 155°, about 160°, about 165°, about 170°, or any value thereinbetween.

In some embodiments, the method according to the present disclosure may produce a nanotextured surface that exhibits a high contact angle after abrasion testing. In some embodiments, the nanotextured surface exhibits a contact angle of at least 110°, at least 115°, at least 120°, at least 125°, at least 130°, at least 135°, at least 140°, at least 145°, at least 150°, at least 155°, at least 160°, at least 165°, at least 170° after abrasion testing using a cloth wipe resistance test. In some embodiments, the nanotextured surface exhibits a contact angle of at least 110°, at least 115°, at least 120°, at least 125°, or at least 130°, at least 135°, at least 140°, at least 145°, at least 150°, at least 155°, at least 160°, at least 165°, at least 170° after a cloth wipe resistance test under a load of at least 7.5 $N/cm^2$ for at least 10,000 cycles, at least 20,000 cycles, at least 30,000 cycles, at least 40,000 cycles, at least 50,000 cycles, at least 75,000 cycles, at least 100,000 cycles, at least 150,000 cycles, at least 200,000 cycles, at least 250,000 cycles, at least 300,000 cycles, at least 350,000 cycles, or at least 400,000 cycles, or greater.

Embodiments according to the present disclosure will be described more fully hereinafter. Aspects of the disclosure may, however, be embodied in different forms and should not be construed as limited to the embodiments set forth herein. Rather, these embodiments are provided so that this disclosure will be thorough and complete, and will fully convey the scope of the technology to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 layers refers to groups having 1, 2, or 3 layers. Similarly, a group having 1-5 layers refers to groups having 1, 2, 3, 4, or 5 layers, and so forth.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. The present examples, along with the methods described herein are presently representative of embodiments and are exemplary, and are not intended as limitations on the scope of the disclosure. Changes therein and other uses which are encompassed within the spirit of the disclosure as defined by the scope of the claims will occur to those skilled in the art. It is to be understood that this present technology is not limited to particular methods, reagents, compounds compositions or biological systems, which can, of course, vary. The terminology used in the description herein is for the purpose of describing particular embodiments only and is not intended to be limiting.

EXAMPLES

Example 1: Durable Hydrophobic Nanotextured Surfaces Prepared by Flame Deposition Flame Deposition Nanotextured coatings were deposited onto 2-mm thick glass substrates using an flame deposition apparatus and procedure. Octamethylcyclotetrasiloxane ("OMCTS") was dissolved in ethyl alcohol (Sinopharm, >99.7%) as a liquid-phase precursor for $SiO_2$. The OMCTS was pumped into a vaporizer apparatus using a syringe pump, where it was heated to generate precursor vapor, which was then directed into a burner apparatus using nitrogen carrier gas through a central tube in the nozzle (FIG. 1). The precursor injection rate to the vaporizer apparatus controls the rate at which the liquid precursor is delivered to the vaporizer and then converted into vapor. The precursor delivery rate and precursor concentration were controlled by controlling the precursor injection rate (Table 1), as well as the carrier gas flow rate, which was varied between 2 and 60 SLPM.

Once precursor vapor was delivered to the burner by nitrogen carrier gas through a central tube, $SiO_2$ nanoparticles were generated by combusting the vaporized precursor in a flame generated by igniting a pre-mixed $CH_4/O_2$ gas stream introduced into the burner through the outer ring of the nozzle. Referring to FIG. 1, excess oxygen was supplied as inner- and outer-shield $O_2$ gas (introduced into the burner through concentric annular rings between the central tube and outer ring), and was used to drive combustion of the precursor. The solid nanoparticles thus produced within the flame zone and within the $N_2$ carrier gas stream were delivered to the glass substrates by the $N_2$ carrier gas flow. The glass substrates were placed into an auto-moving sample holder, which moved the substrates face-down over the flame generated by the burner (and over the carrier gas stream) at speeds of 60 or 70 mm/s.

Post-Flame Deposition Coating

ETC Coating 1. Following deposition of $SiO_2$ particles onto the glass substrates, the nanotextured surfaces thus produced were further coated to decrease their surface energy and increase their hydrophobic character. Samples labeled "ETC Coating 1" first underwent flame deposition processing according to the process parameters summarized for samples A-D in Table 1. Immediately after removal from the flame deposition apparatus, the samples were immersed in a dilute solution (1% by mass) of Daikin UD509 solution (Daikin Chemicals) for 1 hour. (Daikin UD509 is a solution of a fluorinated silane polymer in ethoxy-nonafluorobutane ($C_4F_9OC_2H_5$; Novec HFEO-7200 (3M Company)). After removal from UD509 solution, the coatings were cured at 120° C. for 30 min to promote silane bonding to the $SiO_2$ surface. The samples were then ultrasonicated in fresh Novec HFEO-7200 solvent for 1 minute at 40 kHz to remove physisorbed material.

ETC Coating 2. Samples labeled "ETC Coating 2" were prepared according to the procedure detailed above for "ETC Coating 1," except that instead of coating the nanotextured surfaces by immersing the samples in Daikin UD509 solution, the samples were manually coated with 0.1 mass % Daikin UD509 solution. According to this procedure, the UD509 solution was sprayed onto a cleanroom cloth, and the solution was applied to the sample surface by wiping the surface with the cleanroom cloth to distribute UD509 solution across the surface. Finally, the coatings were cured at 120° C. for 30 min to promote silane bonding to the $SiO_2$ surface. The samples were then ultrasonicated in fresh Novec HFEO-7200 solvent for 1 minute at 40 kHz to remove physisorbed material.

Multiple processing parameters, including $CH_4$ and $O_2$ gas flow rates, glass movement speed, number of passes through the flame ("coatings"), and precursor injection rate, were varied to alter surface texture, feature size, particle density, coating thickness, and topology. Table 1 summarizes the process parameters used to produce four different nanotextured surfaces (Samples A-D) comprising $SiO_2$ nanoparticles on glass substrates.

TABLE 1

Processing Conditions, Contact Angle, and Abrasion Testing Results for Nanotextured Surfaces Prepared According to the Present Disclosure.

| Sample | Precursor Injection Rate (to Vaporizer) (mL/min) | Substrate Moving Speed (mm/s) | Coatings (#) | $CH_4/O_2$ Flow Rate (SLPM) | Inner Shield $O_2$ Flow Rate (SLPM) | Outer Shield $O_2$ Flow Rate (SLPM) | ETC Coating 1 Initial Contact Angle | ETC Coating 1 Post-Abrasion Contact Angle | ETC Coating 2 Initial Contact Angle | ETC Coating 2 Post-Abrasion Contact Angle |
|---|---|---|---|---|---|---|---|---|---|---|
| A | 0.3 | 70 | 2 | 20/14 | 1 | 1.5 | 117.9 | 124.1 | 143.8 | 132.5 |
| B | 2 | 70 | 1 | 20/16 | 4 | 8 | 113.4 | 122.3 | 120.9 | 129.0 |
| C | 5 | 60 | 1 | 35/30 | 1 | 1.5 | 114.4 | 128.9 | — | — |
| D | 15 | 60 | 1 | 35/30 | 1 | 1.5 | 116.7 | 126.5 | — | — |

Structural Characterization.

Secondary electron images were acquired using a Hitachi S-4800 field-emission scanning electron microscope (Hitachi High-Technologies Corp.). The morphology was magnified 50 k times, and captured using a mixed signal from backscattered electron and scanning electron detectors. AFM images were acquired using a Veeco Dimension 3100 Atomic Force Microscope (Veeco Instruments Inc.).

Figure 3A:
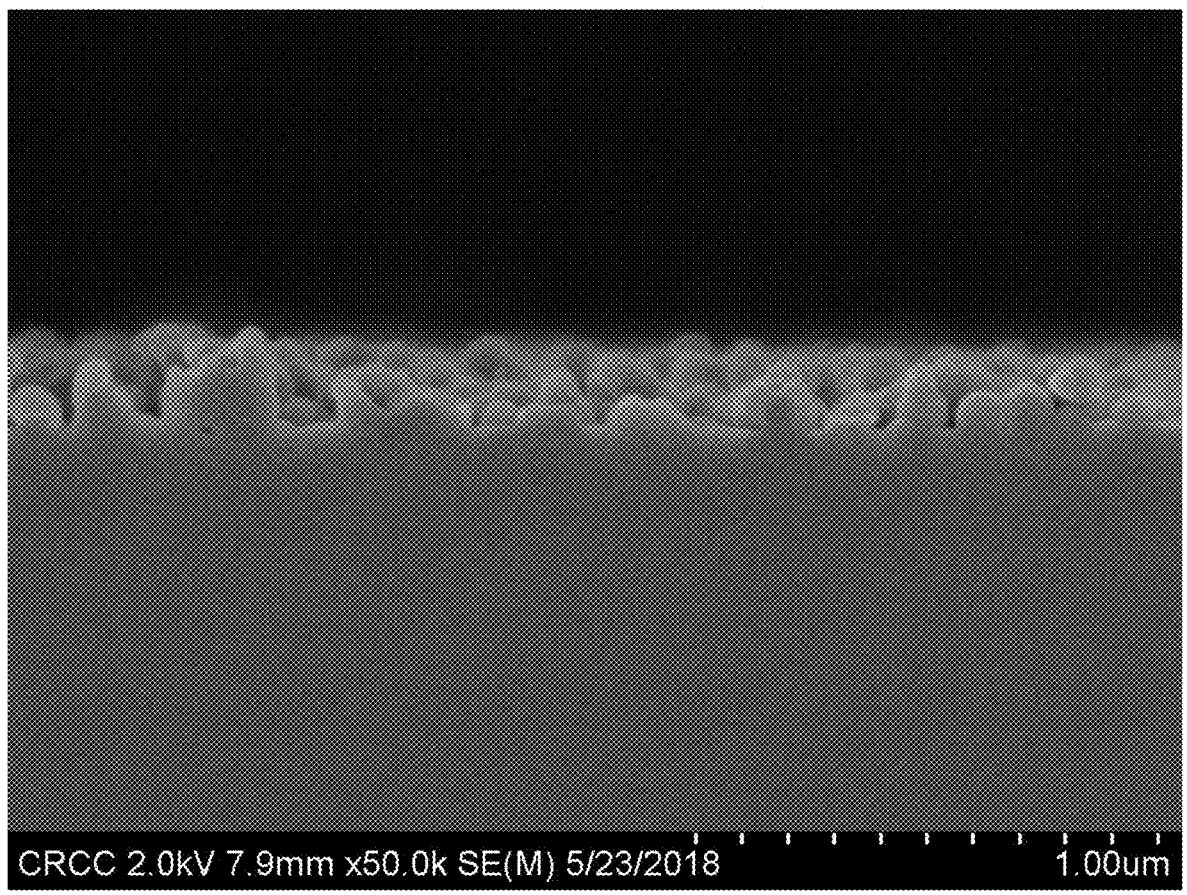
FIGS. 3A and 3B show cross-sectional SEM images of nanotextured coatings prepared according to the present disclosure.
Figure 3B:
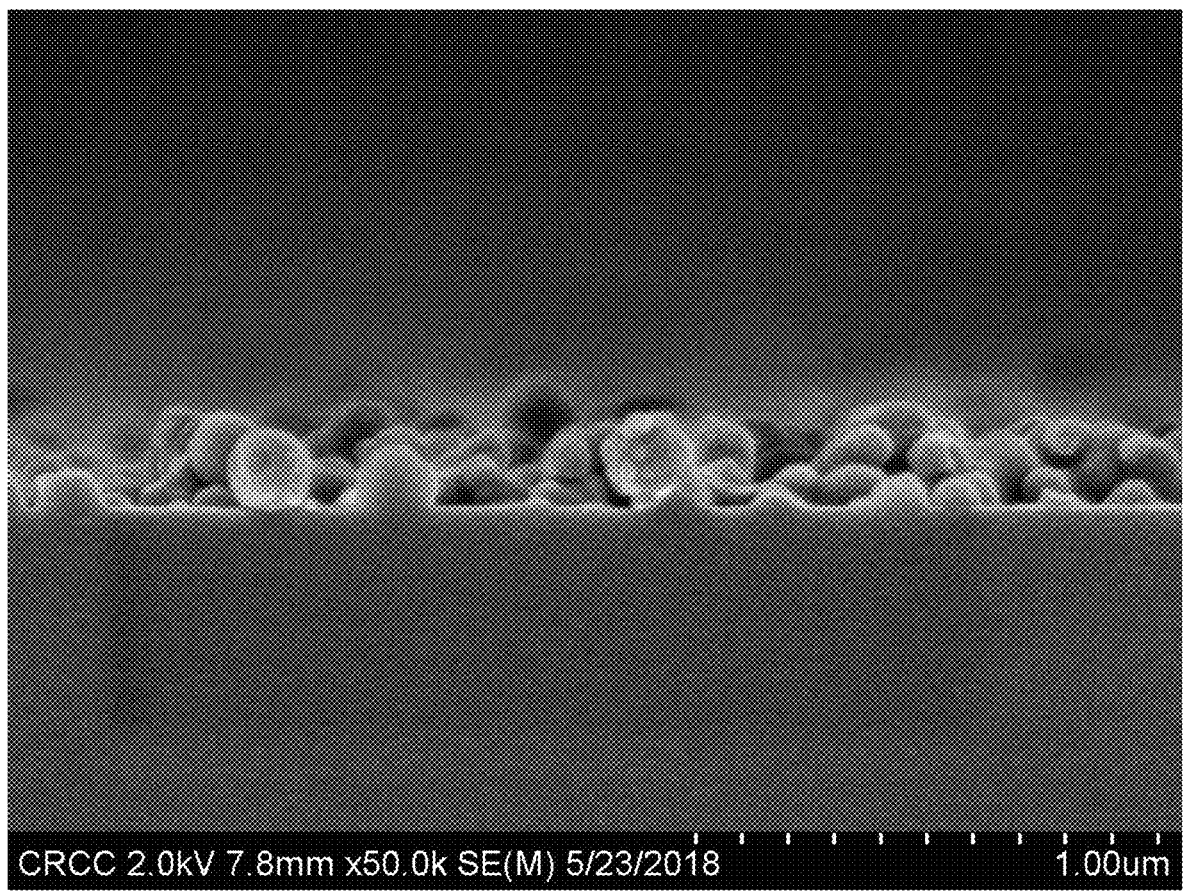
Figure 4A:
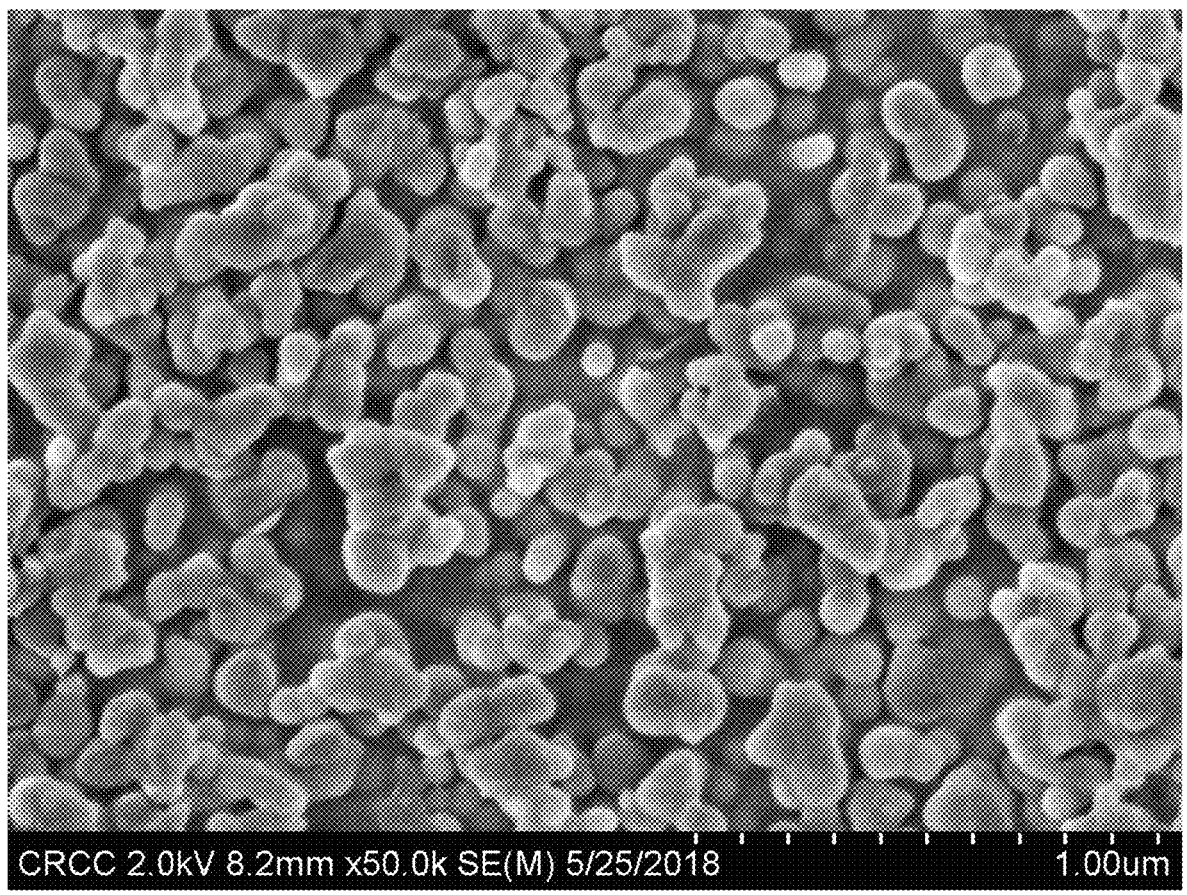
FIGS. 4A-4D show top-down SEM images of nanotextured surfaces prepared according to the present disclosure.
Figure 4B:
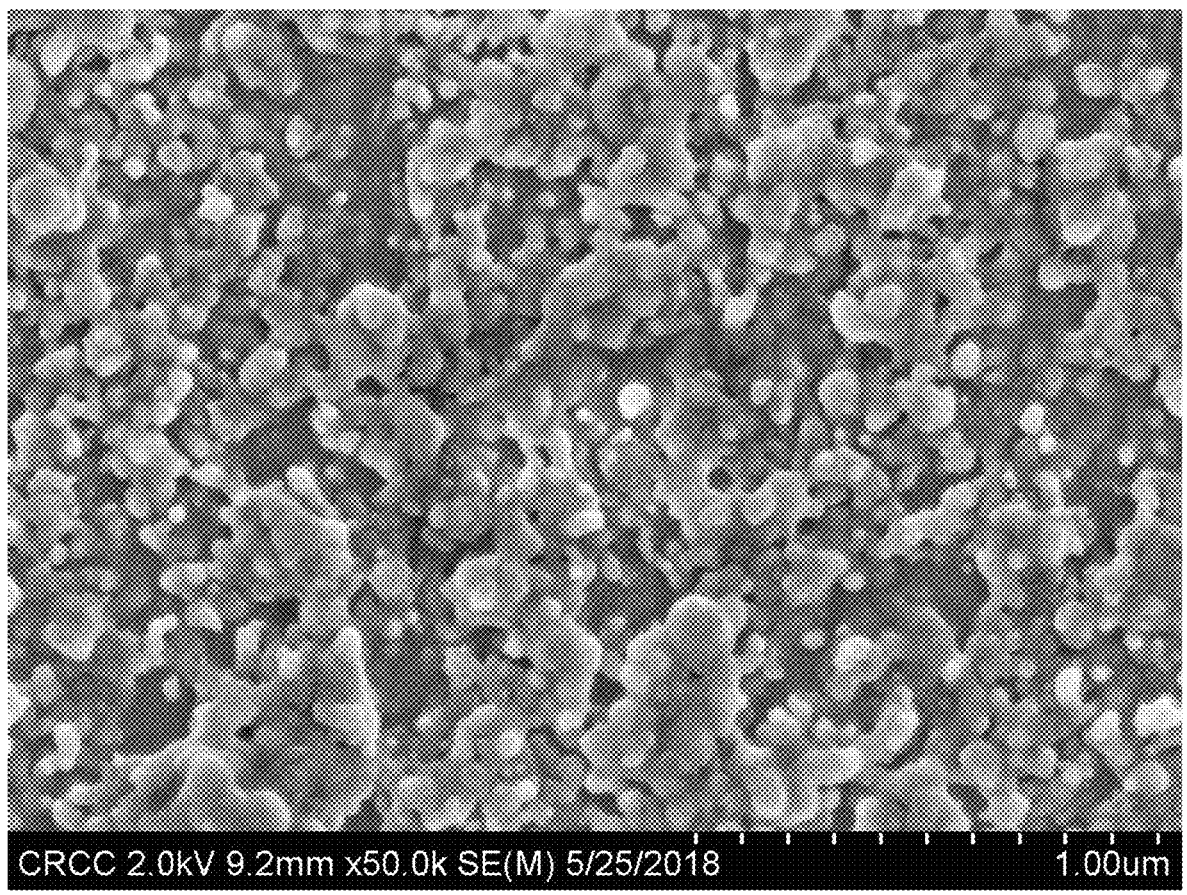
Figure 4C:
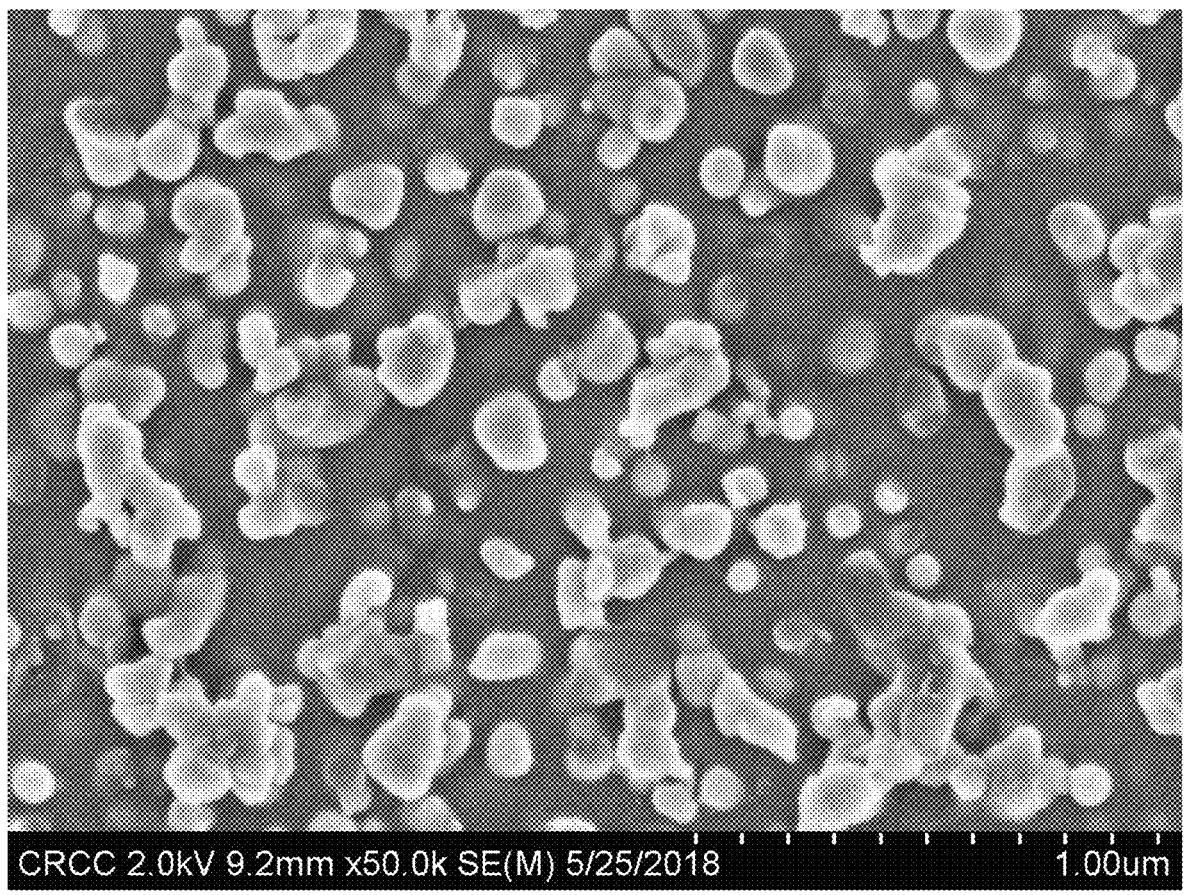
Figure 4D:
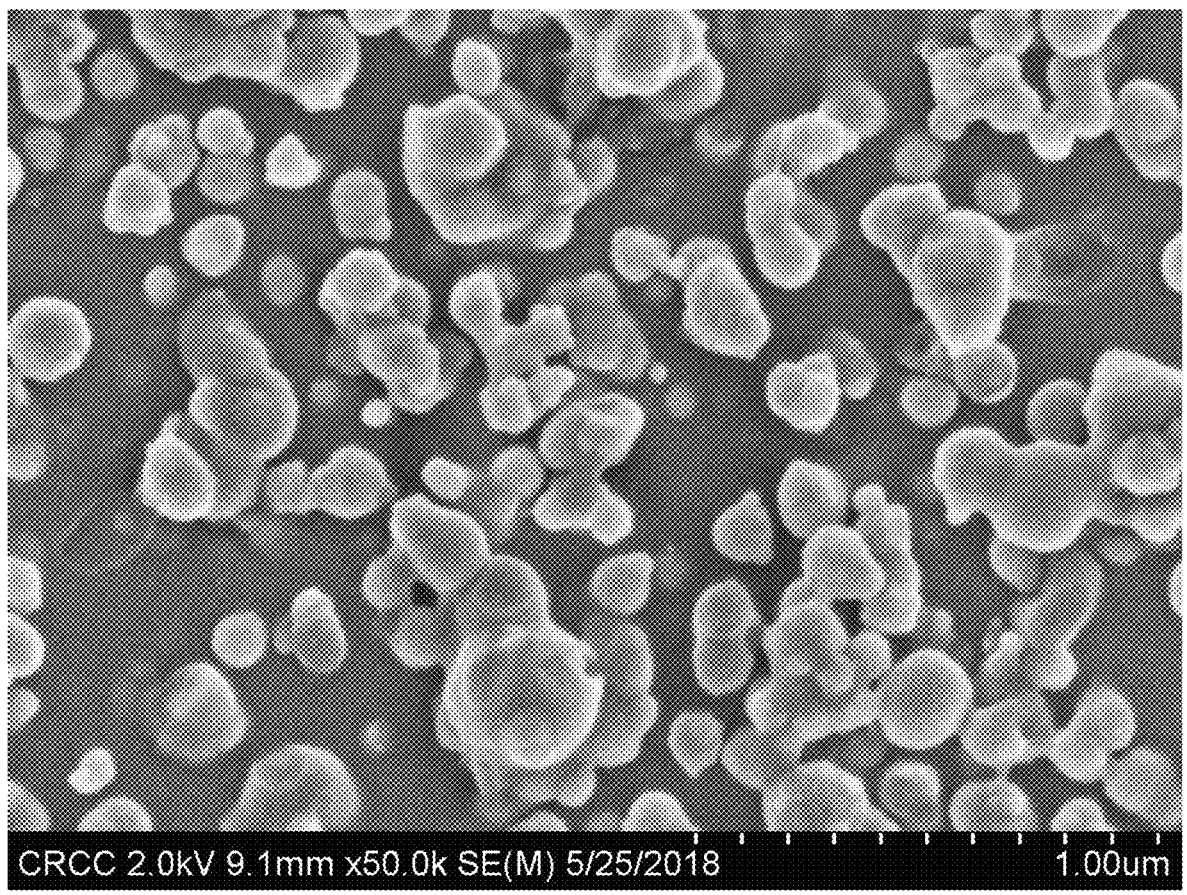
Figure 5A:
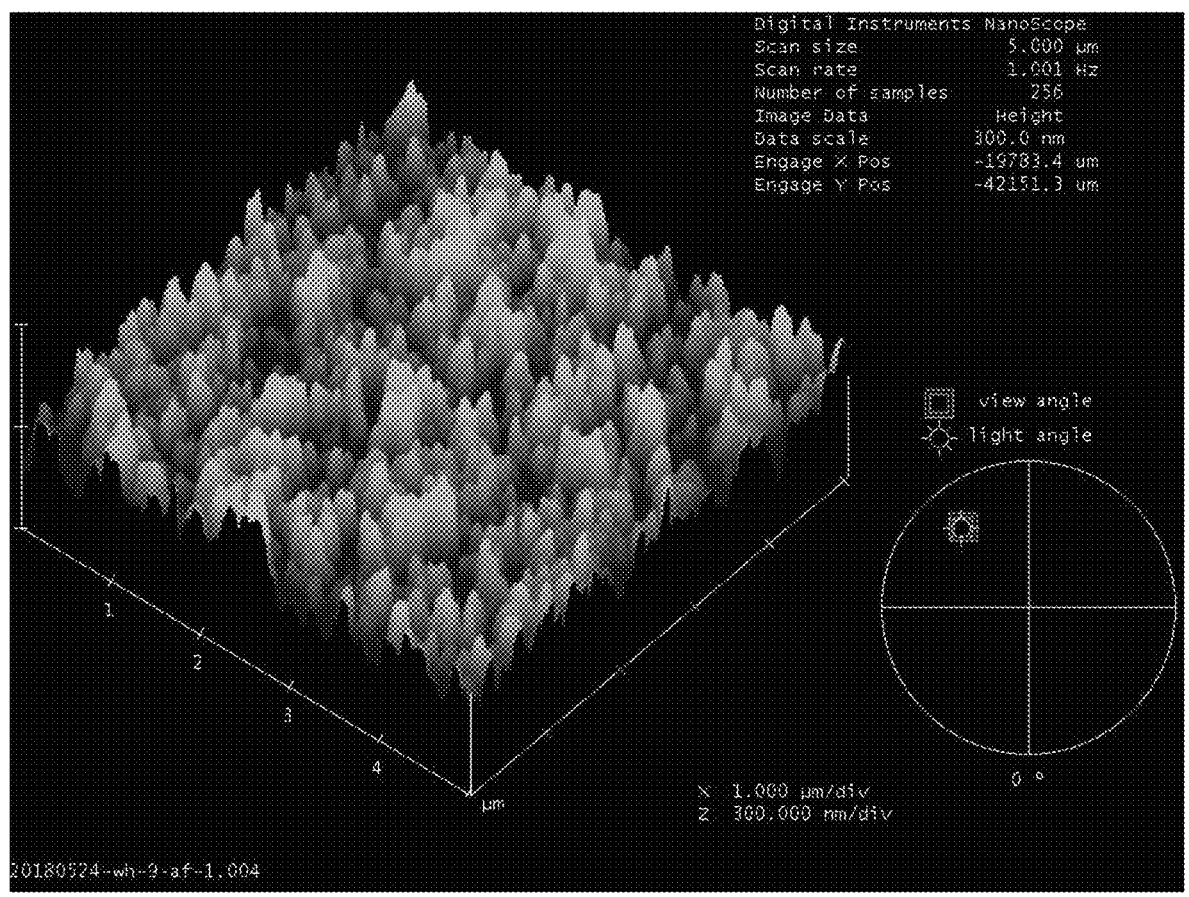
FIGS. 5A-5D show AFM images of nanotextured surfaces prepared according to the present disclosure.
Figure 5B:
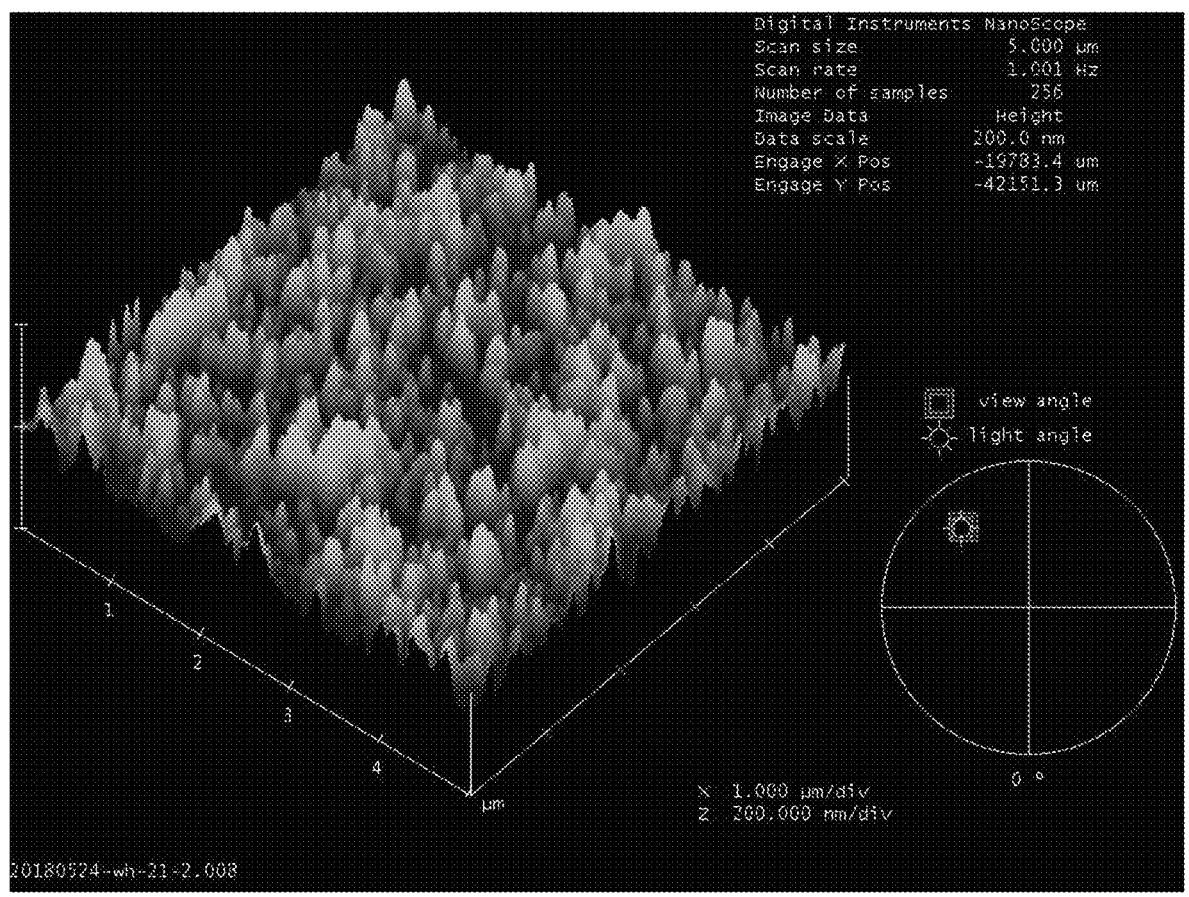
Figure 5C:
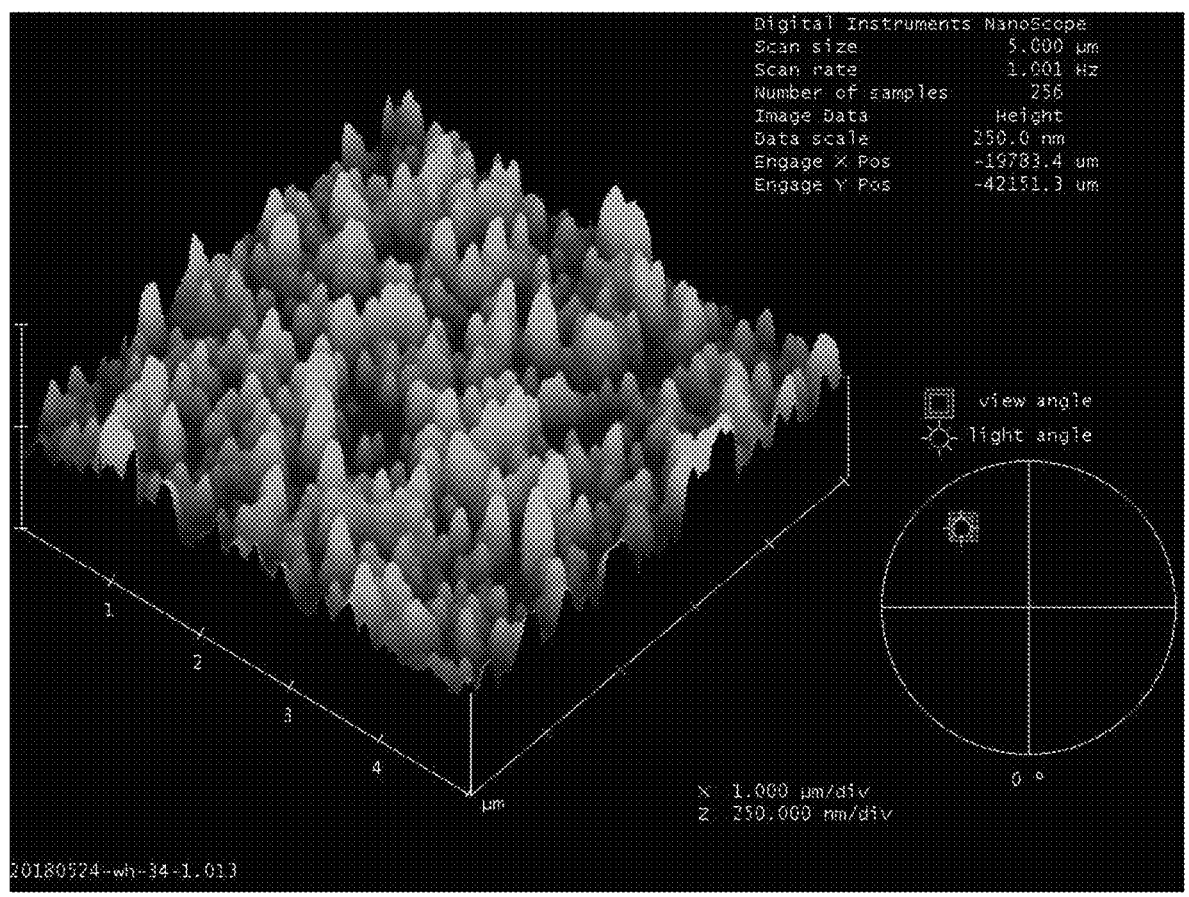
Figure 5D:
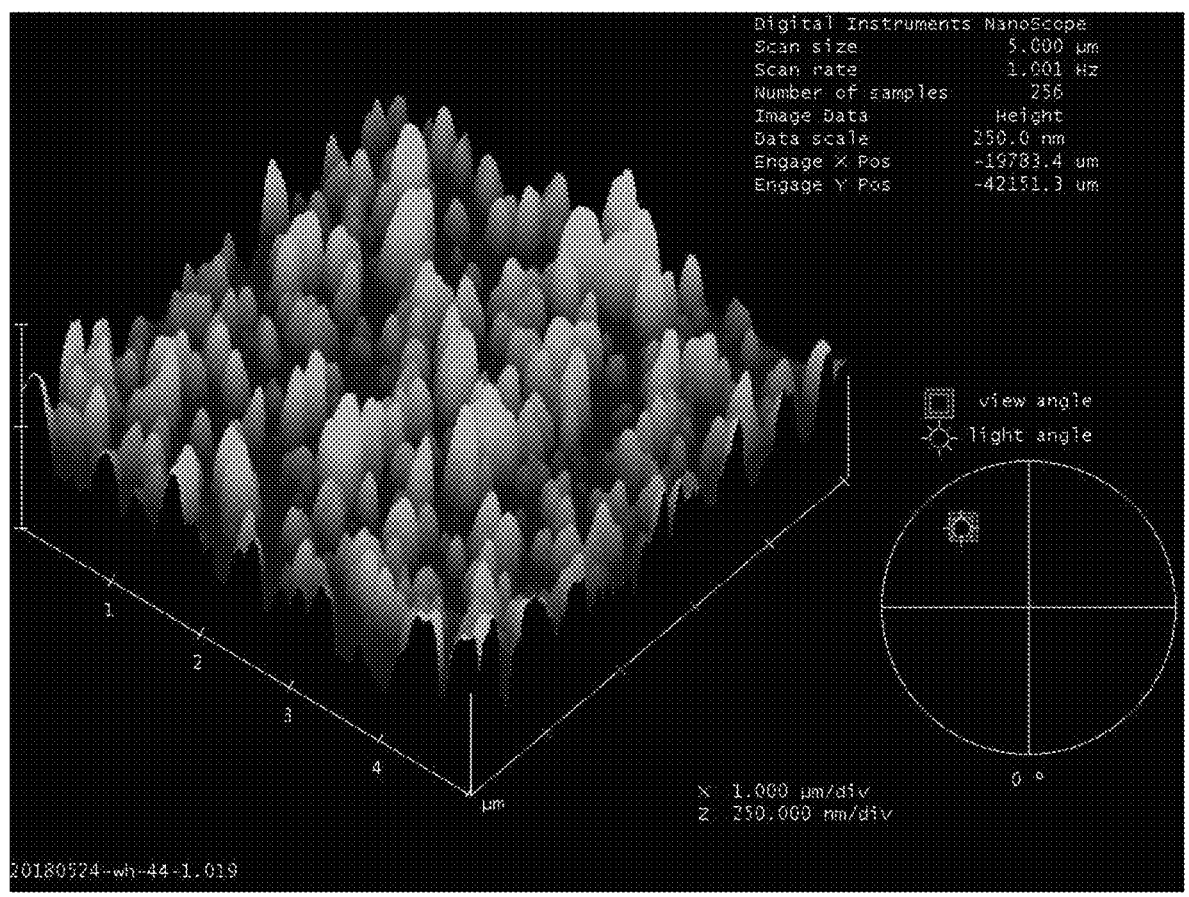

Structural Characterization Results. FIGS. 3A-B show cross-sectional SEM images of nanotextured surfaces prepared according to the present disclosure. (FIGS. 3A and 3B correspond to Samples A and D, respectively.) As shown in the figures, the flame deposition method produces nanotextured surfaces by sintering (i.e., "fusing") the nanoparticles formed in the carrier gas stream to the substrate surface. While not being bound to any particular theory, this sintering and structural integration of nanoparticles into the substrate is believed to result from softening (reduced viscosity) of the substrate surface as it travels over and/or through the flame. When nanoparticles formed in the flame deposition apparatus impact the softened substrate surface, they become embedded into the surface and bond (or fuse) to the substrate material several molecular or atomic layers deep, rather than simply becoming chemisorbed or physisorbed to the topmost surface layer. Additionally, the nanoparticles (which are also heated in the flame deposition apparatus) sinter to adjacent particles, as well as to the substrate surface, evidenced by the "necking" between adjacent particles. Thus, the flame deposition process combines nanoparticle formation, substrate heating, coating, and sintering into a single process, yielding nanotextured surfaces that are sintered to (or incorporated into) the underlying substrate material. Fusing the nanoparticles into the substrate is believed afford stronger adhesion than is observed in cases where the nanoparticles are physisorbed onto the surface or only chemisorbed through a limited number of surface-to-surface bonds.

Particle size, coating thickness, particle size distribution, and areal density can be adjusted by varying the flame deposition coating parameters. FIGS. 4A-D show top-down SEM images acquired for Samples A-D, respectively, before applying any ETC coating material. Corresponding AFM images are shown in FIGS. 5A-D. As shown by the figures, varying the flame deposition process parameters permits variation in the particle size, areal density, degree of sintering, and coating thickness.

Figure 6:
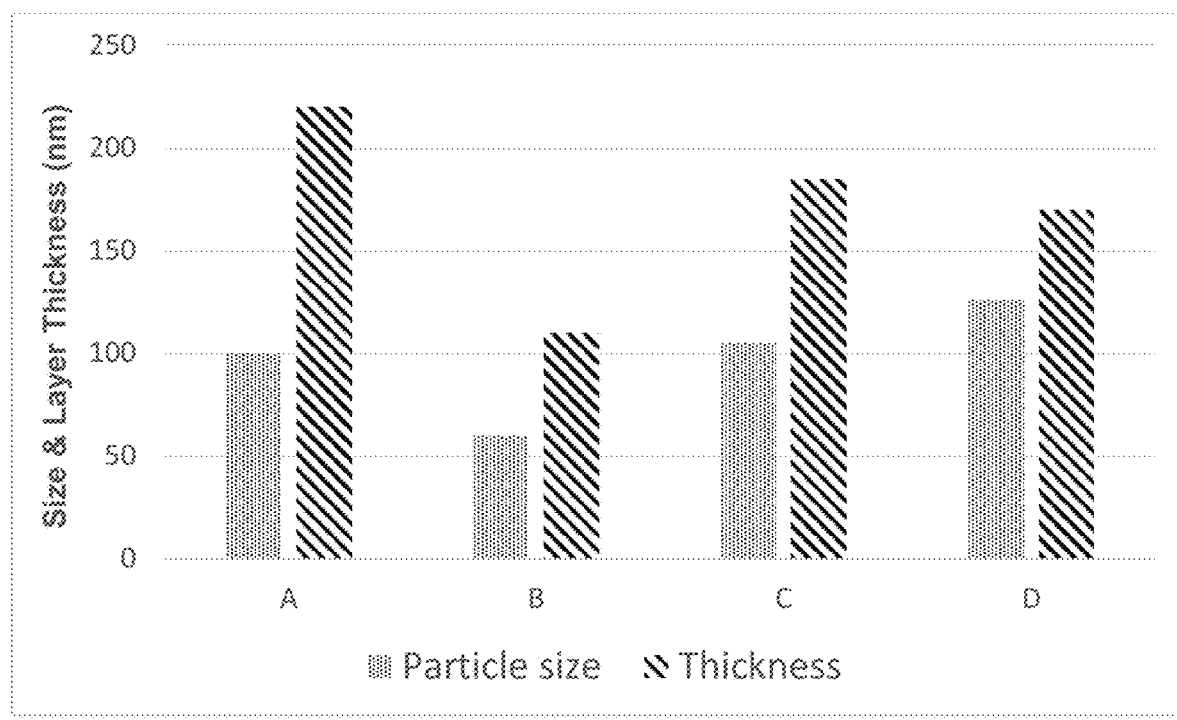
FIG. 6 plots particle size and coating thickness for nanotextured surfaces prepared according to the present disclosure.

FIG. 6 plots average particle size and coating thickness as a function of the flame deposition process parameters (Samples A-D). The flame deposition process yields $SiO_2$ nanoparticles that are approximately 50 nm to 150 nm in diameter, well within the desired feature size limitations for maintaining substrate transparency. In some cases, sintering of adjacent particles results in formation of larger feature sizes (see, e.g., FIGS. 4D, 5D). Meanwhile, as shown in FIG. 6, overall coating thicknesses of between 100 nm and 250 nm are readily obtained.

Performance Testing: Water Contact Angle and Abrasion

Contact Angle Measurements. Initial and post-abrasion water contact angle measurements were conducted using an OCA-20 (DataPhysics Instruments GmBH) instrument for optical contact angle measurement using the sessile drop method. A deionized water droplet (2 μL) was ejected from a syringe at a rate of 2 μL/s onto the sample surface. After 30 seconds, the contact angle at the air-liquid-solid interface was measured. Each reported value represents the average value for contact angles measured at five different locations on the substrate.

Abrasion Testing. Cloth wipe resistance testing ("cheese cloth testing") was performed using a Taber 5900 Reciprocating Abraser (Taber Industries) equipped with a Crockmeter attachment. Each sample was fixed to an auto-movable sample stage, which could be programmed to operate at a predetermined speed and a predetermined number of wipe cycles. Contact with the sample surface was made using an abrasive tip, covered by a crocking cloth (AATCC Crockmeter Standard Rubbing Cloth; AATCC CROCK 2, Testfabrics, Inc.). All cloth wipe resistance tests were performed using a load of 7.5 $N/cm^2$ and at an abrasion speed of 30 cycles/min and 45 cycles/min for samples labeled "ETC Coating 1" and "ETC Coating 2," respectively. One back-and-forth movement of the cloth-covered tip against the sample surface is considered one cycle. Samples labeled "ETC Coating 1" and "ETC Coating 2" were subjected to 100,000 and 200,000 cycles, respectively.

Performance Characterization Results. Contact angle results for samples A-D, both pre- and post-abrasion, are summarized in Table 1. According to the data, the initial water contact angles were between 113.4° and 143.8° for all samples prepared according to the present disclosure. Notably, for the same flame deposition conditions, samples manually coated with Daikin UD509 ("ETC Coating 2") showed higher initial contact angles than those coated by immersion coating ("ETC Coating 1"). See, e.g., Samples A and B. Indeed, the highest initial contact angle observed in this study was 143.8°, for sample A with "ETC Coating 2".

The data shows that nanotextured surfaces prepared according to the present disclosure exhibit high contact angles (>120°), even after applied abrasion testing over hundreds of thousands of cycles. The contact angles for all samples included in the study were between 122.3° and 132.5° after abrasion testing. The high water contact angles measured after abrasion testing indicate that the methods according to the present disclosure produce nanotextured surfaces having sufficient structural stability to avoid being desorbed or de-adhered during abrasion testing, even after 200,000 cycles.

Before applying the ETC coating, the bare nanotextured $SiO_2$ surface is very hydrophilic, exhibiting a water contact angle of less than 5°. And although all the samples exhibit water contact angles of greater than 120° after abrasion testing, Samples A-D show lower water contact angles (less than 120°) after applying ETC Coating 1 but before abrasion testing, than after abrasion testing (greater than 120°). It is believed that ETC Coating 1 is thick enough to decrease the surface roughness, thereby reducing the water contact angle relative to identically-prepared samples having ETC Coating 2, which is thinner. It is hypothesized that abrasion testing removes some of the ETC coating, so the surface roughness increases, causing an increase in the water contact angle observed after abrasion testing (Table 1) for these samples.

Notably, the water contact angle of sample A with "ETC Coating 2" decreases after abrasion testing (200,000 cycles). It is hypothesized that this decrease is also due to removal of the ETC coating. The coating material applied by ETC Coating Method 2 is thinner than that applied by ETC Coating Method 1. Further, as shown in FIG. 6, Sample A exhibits the largest peak-to-valley height difference (i.e., thickness) of any of samples studied (based on AFM images). Thus, it is believed that the ETC coating is relatively easier to remove from Sample A than for the other samples. Accordingly, less surface area was covered by coating material after abrasion testing, causing a decrease in the contact angle. Alternatively, the abrasion testing on this sample may slightly reduce the surface roughness, for example, by removing the outermost nanoparticles that are not fused directly to the substrate or which are only sintered to adjacent particles through thin bridges. This may also cause a slight decrease in contact angle. At any rate, the contact angle of this sample remained over 130°, even after 200,000 abrasion test cycles, demonstrating the robustness of the nanotextured surfaces thus obtained.

Figure 7A:
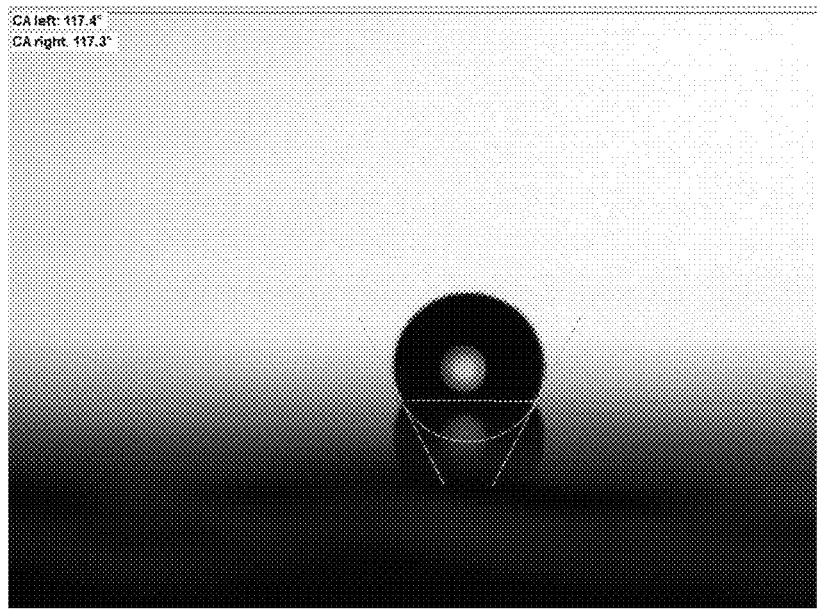
FIGS. 7A and 7B show water contact angles before and after abrasion testing, respectively, for a nanotextured surface prepared according to the present disclosure.
Figure 7B:
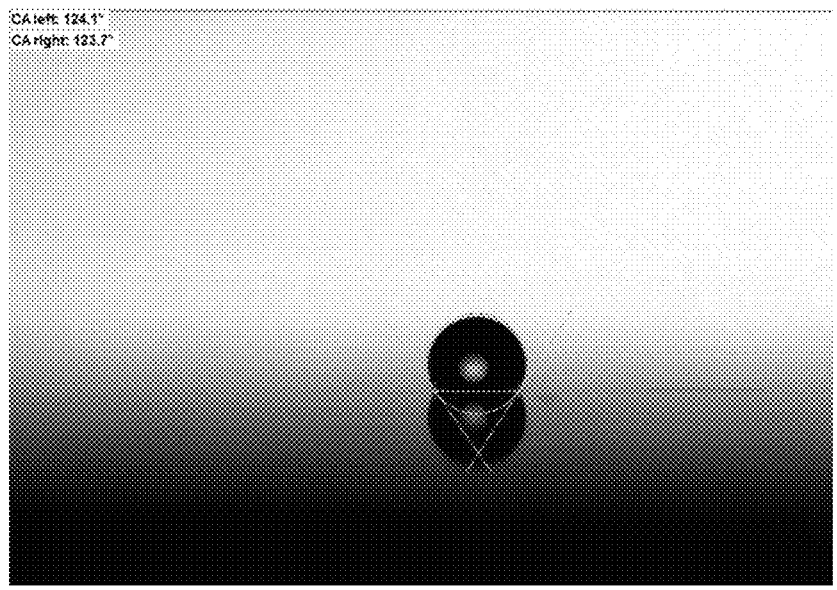
Figure 8A:
FIGS. 8A and 8B show water contact angles before and after abrasion testing, respectively, for a nanotextured surface prepared according to the present disclosure.
Figure 8B:
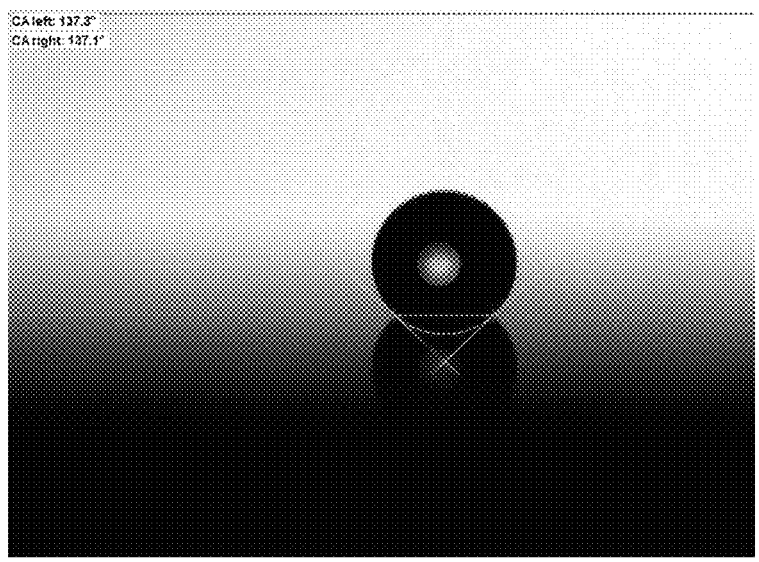

FIGS. 7A-B and 8A-B show that nanotextured surfaces prepared according to the present disclosure exhibit high contact angles, before and after abrasion testing. FIGS. 7A and 7B show water droplets and contact angles on nanotextured surfaces of Sample A with "ETC Coating 1", before (7A) and after (7B) abrasion testing for 100,000 cycles at 30 cycles/min. Similarly, FIGS. 8A-B show contact angles for a water droplet on Sample A with "ETC Coating 2", before (8A) and after (8B) abrasion testing for 200,000 cycles at 45 cycles/min.

Without being bound to any particular theory, it is believed that methods according to the present disclosure enable production of durable, high-contact-angle surfaces because their nanotextured surface morphologies stabilize the Cassie-Baxter state.

When a fluid contacts a surface, interfacial energies balance to a minimum, resulting in a three-phase contact angle, as described by Young's Equation (Equation 1):

$$\cos\theta = \frac{\gamma_{sv} - \gamma_{ls}}{\gamma_{lv}} \quad \text{(Equation 1)}$$

where θ is the contact angle, $\gamma_{sv}$ is the solid-vapor surface tension, $\gamma_{ls}$ is the liquid-solid surface tension, and $\gamma_{lv}$ is the liquid-vapor surface tension.

High-energy surfaces have lower contact angles than low-energy surfaces when comparing common fluids. Physical or chemical non-uniformity (heterogeneity) will alter the observed contact angle. A liquid droplet on a rough surface can assume one of two equilibrium states: (1) the Wenzel state; or (2) the Cassie-Baxter state. In the Wenzel state, the liquid fully wets the solid surface, causing an increase in the real area of contact between the liquid and the solid surface. Wenzel's Equation is derived from the fact that a roughened surface will have a larger area of contact between the surface and the droplet:

$$\cos\theta_A = r\cos\theta_T \quad \text{(Equation 2)}$$

Here, $\theta_T$ is the contact angle on a flat surface, $\theta_A$ is the observed contact angle, and r is the Wenzel roughness, which is the ratio of the true surface area to the geometric area of the measurement. Roughened high-energy surfaces (<90° contact angle) will promote droplet spreading, further lowering the contact angle, whereas roughened low-energy surfaces (>90° contact angle) will discourage droplet spreading, thereby increasing the contact angle compared to analogous flat surfaces.

A flat glass surface coated with a fluoropolymer (i.e., a low-energy surface) has a water contact angle of approximately 120°. However, a superhydrophobic surface in the Wenzel state is possible if the surface is textured (i.e., has increased roughness). However, because the Young's contact angle for oil and other organic liquids is less than 90° on flat surfaces, even when coated with a fluoropolymer, oleophobicity is not possible in the Wenzel state.

In the Cassie-Baxter state, a composite solid-liquid-air interface develops, where air is trapped underneath the liquid. Thus, there is a reduction in the true area of contact between the liquid and the solid surface, and a significant portion of the liquid meniscus may be suspended in air. In this case, the apparent contact angle is given by Equation 3:

$$\cos\theta_A = f_1 \cos\theta_T - f_2 \quad \text{(Equation 3)}$$

where $\theta_T$ is the contact angle on a flat surface, $\theta_A$ is the observed contact angle, $f_1$ is the fractional area of fluid contact and $f_2$ is the fractional area of air liquid contact beneath the droplet.

Without being bound to any particular theory, it is believed that the hierarchical surface morphology of the flame-deposited nanotextured surface according to the present disclosure can offer meta-stability to the Cassie-Baxter state by creating local energy barriers.

What is claimed is:

1. A method for producing a nanotextured surface on a substrate, comprising:
    (a) introducing a precursor into a stream of a carrier gas;
    (b) forming nanoparticles from the precursor by subjecting the stream to a flame zone generated by igniting a reactive gas;
    (c) disposing the substrate in the stream of the carrier gas such that a surface of the substrate faces the carrier gas and is within the flame zone;
    (d) heating the surface of the substrate facing the carrier gas using the flame zone; and
    (e) delivering the nanoparticles to the surface of the substrate facing the carrier gas to produce the nanotextured surface having an average surface roughness of 30 nm to 500 nm.

2. The method of claim 1, further comprising (f) coating the nanotextured surface with a coating material after (e).

3. The method of claim 2, wherein the coating material comprises a fluorinated silane.

4. The method of claim 2, wherein the coating (f) comprises: immersion coating from solution, dip coating, manually applying the coating material to the surface of the substrate, spray coating, physical vapor deposition, chemical vapor deposition, or spin coating.

5. The method of claim 2, wherein the nanotextured surface has a water contact angle of at least about 120° after (f) coating the nanotextured surface with the coating material.

6. The method of claim 2, wherein the nanotextured surface has a water contact angle of greater than 120° after abrasion testing using a cloth wipe resistance test applying a load of 7.5 N/cm² for at least 100,000 cycles.

7. The method of claim 1, wherein the precursor is vaporized before being introduced into the stream of the carrier gas.

8. The method of claim 1, wherein the nanotextured surface comprises the nanoparticles sintered to the substrate.

9. The method of claim 1, wherein the nanoparticles comprise silica ($SiO_2$), titania ($TiO_2$), zirconia ($ZrO_2$), alumina ($Al_2O_3$), calcium oxide (CaO), magnesium oxide (MgO), diboron trioxide ($B_2O_3$), zinc oxide (ZnO), or a combination thereof.

10. The method of claim 1, wherein the nanoparticles comprise silica ($SiO_2$).

11. The method of claim 1, wherein the nanoparticles have an average diameter between about 50 nm and 250 nm.

12. The method of claim 1, wherein the forming (b) comprises combustion or hydrolysis of the precursor.

13. The method of claim 1, wherein the nanotextured surface has an average thickness of 30 nm to 1000 nm.

14. The method of claim 1, wherein the heating (d) comprises increasing a temperature of the surface of the substrate facing the carrier gas to between 500° C. and 2000° C.

15. The method of claim 1, wherein the heating (d) comprises adjusting a viscosity of the surface of the substrate facing the carrier gas to between $10^7$ Pa·s and $10^{10}$ Pa·s.

* * * * *